Sept. 8, 1931.    E. J. NOBLE    1,822,056
THREADLESS PIPE CONNECTER
Filed Feb. 7, 1929
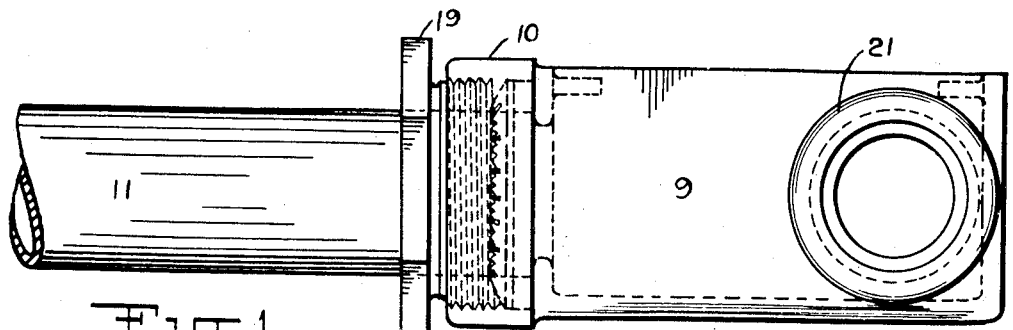
Fig-1
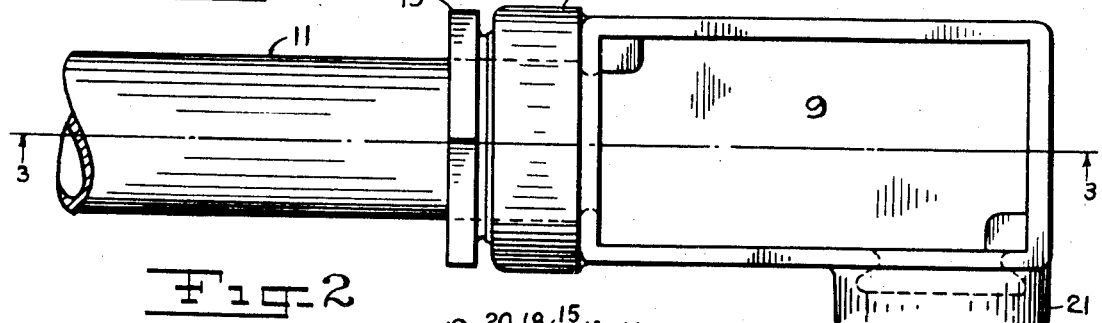
Fig-2
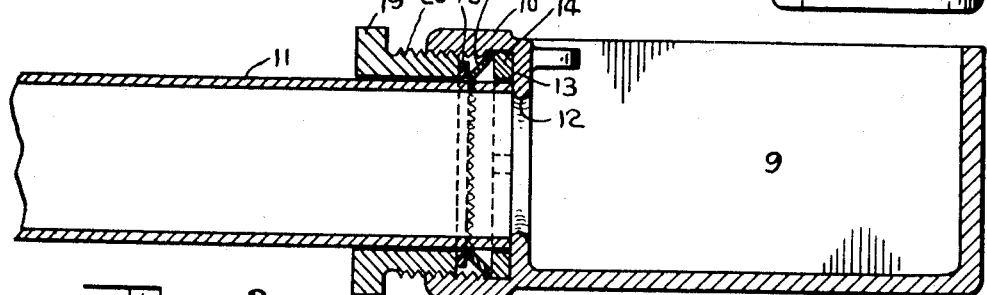
Fig-3
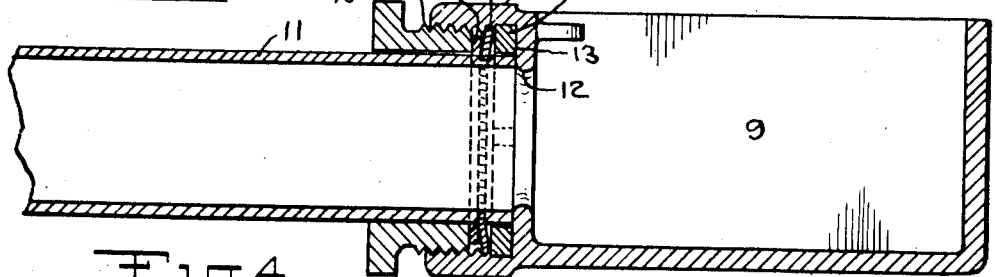
Fig-4
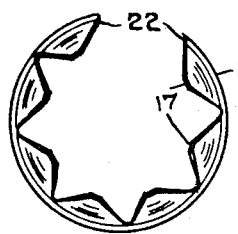
Fig-5
Fig-6
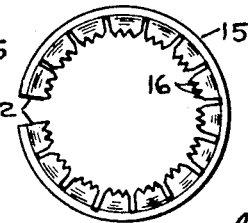
Fig-7    Fig-8
Inventor
Edward J. Noble
By his Attorney
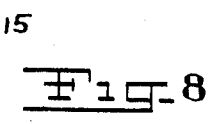

Patented Sept. 8, 1931

1,822,056

UNITED STATES PATENT OFFICE

EDWARD J. NOBLE, OF NEW LONDON, CONNECTICUT, ASSIGNOR, BY DIRECT AND MESNE ASSIGNMENTS, TO GILLETTE-VIBBER COMPANY, INCORPORATED, OF NEW LONDON, CONNECTICUT, A CORPORATION OF CONNECTICUT

THREADLESS PIPE CONNECTER

Application filed February 7, 1929. Serial No. 338,088.

My invention relates to an improvement in a threadless pipe connecter and the novelty consists in the adaptation and arrangement and combination of parts as will be more fully hereinafter pointed out.

Particularly in the running of rigid pipe as a conduit for electrical wiring it is necessary to make connections between said pipe and conduit boxes at frequent intervals and as the pipe must be specially cut to the required length it is essential to eliminate the necessity of threading such pipe ends in order to connect the same to conduit boxes.

My device solves this problem in a simple, inexpensive and efficient manner, insuring a permanently secured connection between said conduit and conduit box and also a water tight connection, but permitting of the ready disassembling of said connection whenever it may become necessary.

Referring to the drawings, Figure 1 is a front elevation of my device showing the connection elements in dotted outline.

Figure 2 is a top plan view of my device.

Figure 3 is a vertical section on the line 3—3 of Figure 2 and shows the locking expansion washer in the unlocked position.

Figure 4 is the same as Figure 3 but shows the lock nut set up against the locking expansion washer in full locked position.

Figure 5 is a top plan view of one form of the locking expansion washer.

Figure 6 is a side view of the same.

Figure 7 is a top plan view of a second form of locking expansion washer, and

Figure 8 is a side view of the same.

In the drawings 9 is a conduit box having an internally threaded flange 10 into which the end of a conduit pipe 11 is adapted to slidably project and the conduit box 9 has an opening 12 into said flange 10 of a substantially smaller diameter whereby a shoulder 13 is formed against which the end of pipe 11 is adapted to rest. A fiber washer 14 is adapted to seat in the flange 10 thereby further insuring a water tight joint and an outwardly flaring flexible locking expansion washer 15 having serrated teeth 16 or beveled cutting edges 17 is adapted to be placed in the flange 10 against the washer 14 with the flaring portion and cutting edges 16 or 17 in the outward position. Another washer 18 is adapted to be mounted over the pipe 11 so as to come in direct contact with the outward flaring portion of the locking expansion washer 15 and a locking nut 19 externally threaded at 20 is adapted to thread into the internal threading of the flange 10. As the locking nut 19 is turned down to the full locking position the washer 18 is pushed against the outward flaring edge of the locking expansion washer 15 thereby pushing it in turn against the washer 14 which is compressed against the shoulder 13 whereby the flare of the locking washer 15 is pressed inwardly toward the conduit box 9 to a more nearly vertical position whereby the serrated teeth 19 or the beveled edges 17 of the locking expansion washer 15 in use will be imbedded or cut into the outer surface of the pipe 11 thereby effecting a tight locking grip on the end of the pipe 11 in the flange 10 of the conduit box 9.

The conduit box 9 also has a second flange 21 integral therewith for effecting a conduit connection in a different direction.

The position of the washers 14 and 18 on either side of the locking expansion flexible washer 15 and the locking nut 19 being turned down into the flange 10 is shown in Figure 3 before the pressure of the locking nut 19 has been put upon the locking expansion flexible washer 15 and Figure 4 shows the same elements after the pressure of the locking nut 19 has been fully applied to the washer 15 as described by turning it down to full locking position in the flange 10.

There are two forms of outwardly flaring expansion flexible washers 15 as shown in Figures 5 and 7 and the operation of the serrated teeth 16 of the form 15 shown in Figure 7 will act to cut into the pipe 11 in the same way as the beveled cutting edges 17 of the form of washer 15 shown in Figure 5.

The use of the washers 18 and 14 on either side of the outwardly flaring locking expansion flexible washer 15 prevents the jamming of these parts when the locking nut 19 is turned to full locking position whereby the freeing of these parts is more effectively insured through the use of said washers 18 and 14.

The outwardly flaring locking expansion washers 15 have in both forms as shown in Figure 5 and Figure 7, openings or splits at 22.

It is thus seen that my device effectively locks a conduit pipe 11 in an absolutely rigid position in a conduit box 9 as shown in Figure 4 thereby insuring the rigid connection of the conduit pipe 11 and conduit box 9, but also insuring a water tight connection between the two and the washer 15 being flexible so that it can readily be released upon the removal of the pressure of nut 19.

I claim:

1. In combination a conduit box, an internally threaded neck integral therewith, an outwardly flaring split locking and flexible expansion washer securely held in said threaded neck and engaging a conduit pipe abutting said box in said neck and a lock nut engaging said internally threaded neck whereby the tightening of said lock nut rigidly locks said flexible washer on said conduit pipe and the release of said lock nut releases said washer.

2. In combination a conduit box, an internally threaded neck integral therewith, a conduit pipe end projecting into said neck, a lock nut engaging said internally threaded neck and a split flexible locking expansion washer securely held in said threaded neck and adapted to be compressed between said box and nut from a flared to a substantially vertical position when said nut is set up tightly and said flexible washer releasing itself upon the release of said nut.

3. In combination a conduit box, an internally threaded neck integral therewith, a conduit pipe end projecting into said neck, an outwardly flared split flexible locking expansion washer mounted over said conduit pipe end and securely held in said threaded neck and a lock nut engaging said internal threading adapted to compress said washer against said box into a position imbedding the inner periphery of said washer in the outer surface of the conduit pipe and said flexible washer returning to a flared position upon the release of said nut thereby freeing itself.

4. In combination a conduit box, an internally threaded neck integral therewith, a conduit pipe end projecting into said neck, a flexible washer mounted over said conduit end adjacent said box and securely held in said threaded neck, an outwardly flared split flexible locking expansion washer mounted on said conduit adjacent said flexible washer, a third washer mounted over said conduit adjacent the outward flare of the split flexible locking washer and a locking nut mounted over said conduit adjacent said last washer and adapted to screw into said threaded neck and effect a rigid locking of said conduit pipe in said conduit box by the cutting of the interior edge of said flexible locking washer into said conduit on the tightening of said locking nut and the release of said locking washer on the release of said nut.

In testimony whereof I affix my signature.

EDWARD J. NOBLE.